United States Patent [19]

Yonekura et al.

[11] Patent Number: 5,761,617
[45] Date of Patent: Jun. 2, 1998

[54] PLL SYNTHESIZER RADIO PAGING RECEIVER CAPABLE OF REDUCING AN AVERAGE POWER CONSUMPTION

[75] Inventors: Kunitoshi Yonekura; Masahiro Matai, both of Tokyo, Japan

[73] Assignee: NEC Corporation, Tokyo, Japan

[21] Appl. No.: 497,723

[22] Filed: Jun. 30, 1995

[30] Foreign Application Priority Data

Jun. 30, 1994 [JP] Japan ................................. 6-171721

[51] Int. Cl.$^6$ ................................................ H04B 1/16
[52] U.S. Cl. ...................... 455/343; 455/165.1; 455/260; 455/266
[58] Field of Search .......................... 455/76, 260, 343, 455/165.1, 183.1, 200.1, 266

[56] References Cited

U.S. PATENT DOCUMENTS

| | | | |
|---|---|---|---|
| 4,539,707 | 9/1985 | Jacobs et al. | 455/260 X |
| 4,596,046 | 6/1986 | Richardson et al. | 455/260 |
| 5,058,204 | 10/1991 | Tahernia et al. | 455/260 X |
| 5,175,729 | 12/1992 | Borras et al. | 455/260 X |

FOREIGN PATENT DOCUMENTS 5-90993  4/1993  Japan.
6-260956  9/1994  Japan.

*Primary Examiner*—Chi H. Pham
*Attorney, Agent, or Firm*—Scully, Scott, Murphy & Presser

[57] ABSTRACT

In a radio paging receiver which is for receiving call signals and which includes a control section (5) for making each of a PLL synthesizer section (4), a frequency converter section (2), and a demodulator section (3) carry out intermittent operation selectively in a short intermittent operation cycle synchronized with the call signals and in a long intermittent operation cycle longer than the short intermittent operation cycle, the PLL synthesizer has first and second loop filters (7 and 8) having first and second time constants, respectively. The second time constant is larger than the first time constant. One of the first and the second loop filters is selectively operable at a time. The control section further controls the first and the second loop filters so that the first loop filter is selectively operable when the contol section makes each of the PLL synthesizer section, the frequency converter section, and the demodulator section carry out the intermittent operation in the short intermittent operation cycle and that the second loop filter is selectively operable when the contol section makes each of the PLL synthesizer section, the frequency converter section, and the demodulator section carry out the intermittent operation in the long intermittent operation cycle.

6 Claims, 7 Drawing Sheets

PLL SYNTHESIZER RADIO PAGING RECEIVER CAPABLE OF REDUCING AN AVERAGE POWER CONSUMPTION

BACKGROUND OF THE INVENTION

This invention relates to a radio paging receiver including a PLL synthesizer used as a local oscillator of a frequency converter section of a radio section and, in particular, to a radio paging receiver in which battery saving is achieved by making the radio section carry out an intermittent operation in a plurality of different cycles.

A radio paging receiver of the type described, receives call signals specific to the radio paging receiver at a predetermined period. That is, the call signals specific to the radio paging receiver are periodically or intermittently transmitted by a base station.

For the purpose of battery saving to prolong a battery life, the radio paging receiver generally makes a radio section carry out an intermittent operation to reduce an average current consumption within the receiver. In some of signalling systems, a cycle or period of the intermittent operation of the radio paging receiver is varied in dependence upon traffic of the system. For example, there is a system of alternately selecting, in the radio paging receiver, an intermittent operation cycle for a normal or synchronous mode of receiving operation in synchronism with a cycle of the call signals intermittently transmitted from the base station and another intermittent operation cycle for an asynchronous mode of receiving operation which cycle is longer than the intermittent operation cycle for the normal or synchronous mode of receiving operation.

In some of recent radio paging receivers, a PLL (phase-locked loop) synthesizer is used as a local oscillator of a frequency converter section of the radio section. The PLL synthesizer varies a local oscillation frequency so as to cope with call signals of different frequencies. However, in a case where such PLL synthesizer is used as the local oscillator, a particular time (namely, a lock-up time) is essential until the stabilization of the oscillation frequency after the start of the PLL synthesizer. In this connection, a start margin or spare time corresponding to the lock-up time must be taken into account when the radio section is made to carry out the intermittent operation. Practically, the start margin time is determined as a sum of the lock-up time and an essential margin time. The radio section is operated earlier than reception of the call signal by a time corresponding to the start margin time.

As will later be described, a conventional radio paging receiver can not determine an appropriate start margin time in compliance with variation of the intermittent operation cycle. This results in an increase of an average power consumption and a reduction of a battery life.

SUMMARY OF THE INVENTION

It is an object of this invention to provide a radio paging receiver in which an appropriate start margin time is determined in response to variation of an intermittent operation cycle so as to reduce an average power consumption and to prolong a battery life.

Other objects of this invention will become clear as the description proceeds.

A radio paging receiver to which a first aspect of this invention is applicable is for receiving call signals and comprises PLL synthesizer means for producing a local oscillation signal, frequency converter means for frequency converting the call signals in response to the local oscillation signal to produce a frequency-converted signal, and control means for controlling the PLL synthesizer means and the frequency converter means to make each of the PLL synthesizer means and the frequency converter means carry out intermittent operation in a plurality of different cycles.

According to the first aspect of this invention, the PLL synthesizer has a plurality of loop filters in one-to-one correspondence to the plurality of different cycles of the intermittent operation. The plurality of loop filters have time constants different to each other. One of the plurality of loop filters is selectively operable at a time. The control means further controls the plurality of loop filters so that a corresponding one of the plurality of loop filters is selectively operable when the control means makes each of the PLL synthesizer means and the frequency converter means carry out the intermittent operation in a particular one of the plurality of different cycles. The corresponding one of the plurality of loop filters corresponds to the particular one of the plurality of different cycles.

A radio paging receiver to which a second aspect of this invention is applicable is for receiving call signals and comprises PLL synthesizer means for producing a local oscillation signal, frequency converter means for frequency converting the call signals in response to the local oscillation signal to produce a frequency-converted signal, and control means for controlling the PLL synthesizer means and the frequency converter means to make each of the PLL synthesizer means and the frequency converter means carry out intermittent operation selectively in a short intermittent operation cycle synchronized with the call signals and in a long intermittent operation cycle longer than the short intermittent operation cycle.

According to the second aspect of this invention, the PLL synthesizer has first and second loop filters having first and second time constants, respectively, the second time constant being larger than the first time constant, one of the first and the second loop filters being selectively operable at a time, the control means further controlling the first and the second loop filters so that the first loop filter is selectively operable when the control means makes each of the PLL synthesizer means and the frequency converter means carry out the intermittent operation in the short intermittent operation cycle and that the second loop filter is selectively operable when the control means makes each of the PLL synthesizer means and the frequency converter means carry out the intermittent operation in the long intermittent operation cycle.

DESCRIPTION OF THE PREFERRED EMBODIMENT

Figure 1:
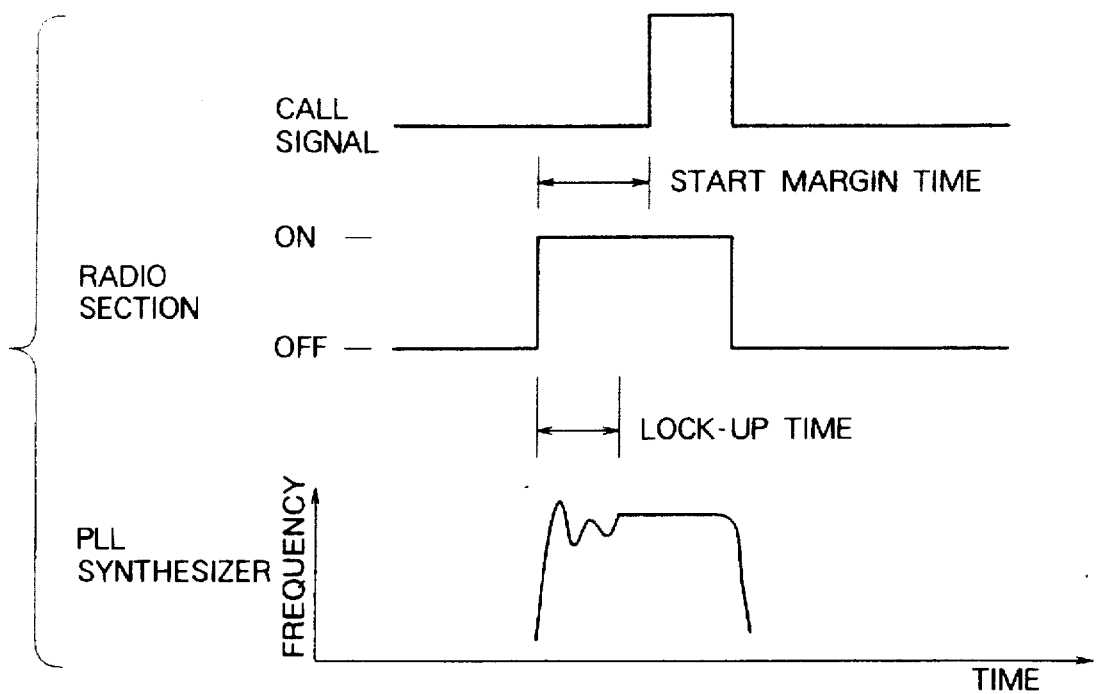
FIG. 1 is a time chart for use in describing operation of a conventional radio paging receiver.

Referring to FIG. 1, operation of a conventional radio paging receiver using a PLL synthesizer will be described at first for a better understanding of this invention. FIG. 1 shows a relationship among the call signal from a base station, an intermittent operation control signal for controlling an intermittent operation of a radio section in the conventional radio paging receiver, and a local oscillator output frequency of the PLL synthesizer. As illustrated in the figure, the operation of the radio section is started earlier than transmission of the call signal addressed to the receiver by a time corresponding to a start margin time. The start margin time is equal to a sum of a lock-up time and an essential margin time as mentioned above.

Figure 2:
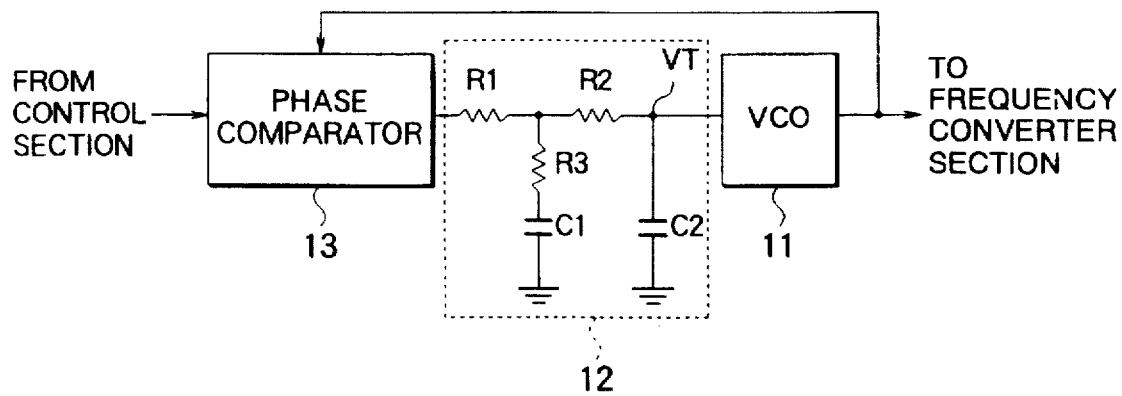
FIG. 2 is a block diagram of a PLL synthesizer used in the conventional radio paging receiver.

Referring to FIG. 2, the PLL synthesizer comprises a voltage controlled oscillator (VCO) 11, a loop filter 12, and a phase comparator 13 supplied with a control signal from a control section which will become clear as the description proceeds. The lock-up time in the above-mentioned PLL synthesizer has a close relationship to the loop filter 12 for producing a control voltage to be supplied to the voltage controlled oscillator 11. Specifically, as illustrated in FIG. 2, a circuitry of one example of the loop filter comprises condensers C1 and C2 and resistors R1, R2, and R3. A time constant of the filter 12 is determined by the condensers and the resistors. In this structure, electric charges charged in the condensers C1 and C2 are gradually discharged by a leak current of each section during an intermittent interval. The leak current is varied in dependence upon the above-mentioned time constant. Discharge is carried out at a higher speed as the time constant becomes small and, on the other hand, requires a longer time as the time constant becomes greater. It will be understood that a charging time exhibits a similar tendency. Accordingly, the lock-up time is generally shorter as the time constant becomes smaller.

Figure 3:
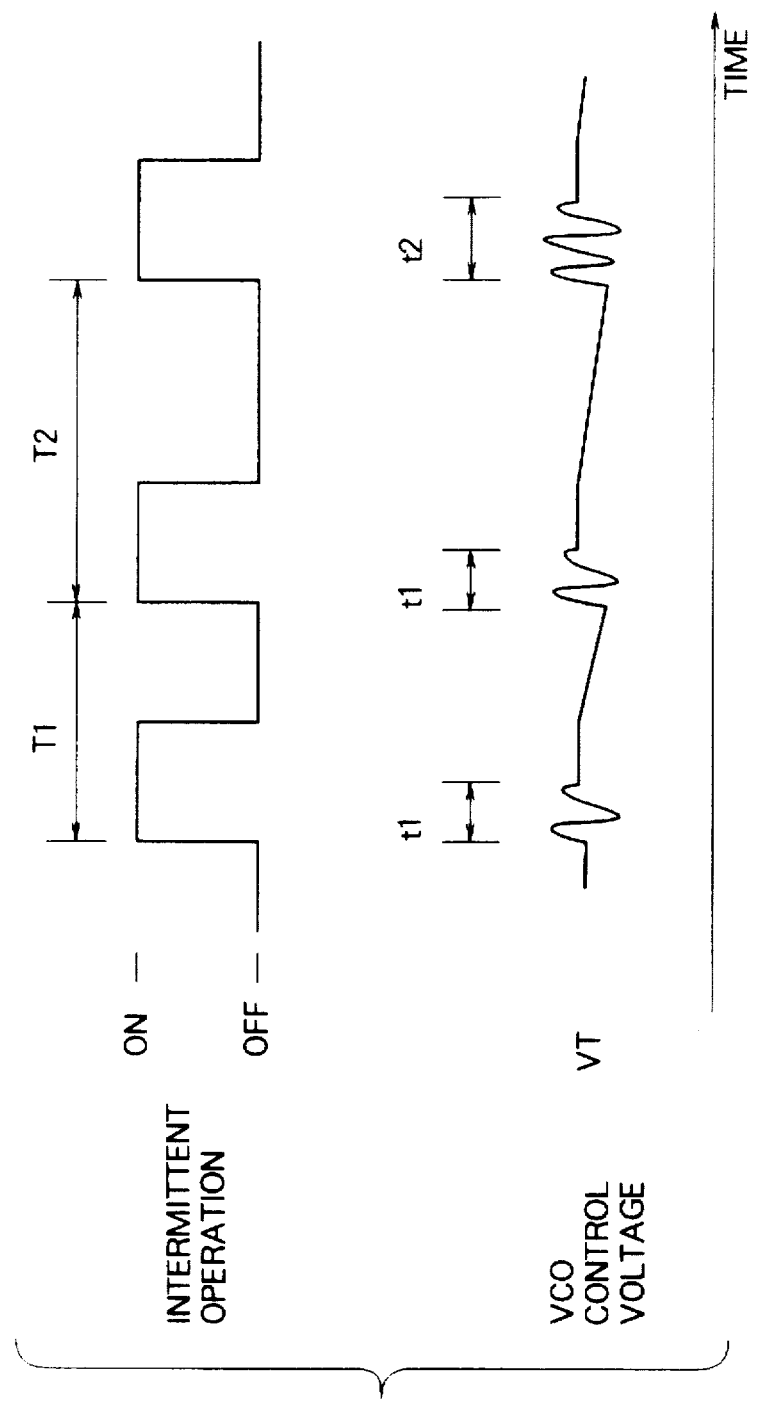
FIG. 3 is another time chart for use in describing operation of the conventional radio paging receiver.

Referring to FIG. 3, attention will be directed to a relationship between the lock-up time t1 or t2 and an intermittent operation cycle T1 or T2. For example, FIG. 3 shows time-based variations of the intermittent operation control signal and the VCO control voltage VT. As illustrated, the voltage VT is gradually discharged during an operation-off period of the intermittent operation and is locked to a predetermined voltage level following the start of an operation-on period of the intermittent operation. When the operation-off period of the intermittent operation is long, such as T2, reduction of the voltage VT has a greater scale. This results in an increase of the lock-up time, such as t2.

Figure 4:
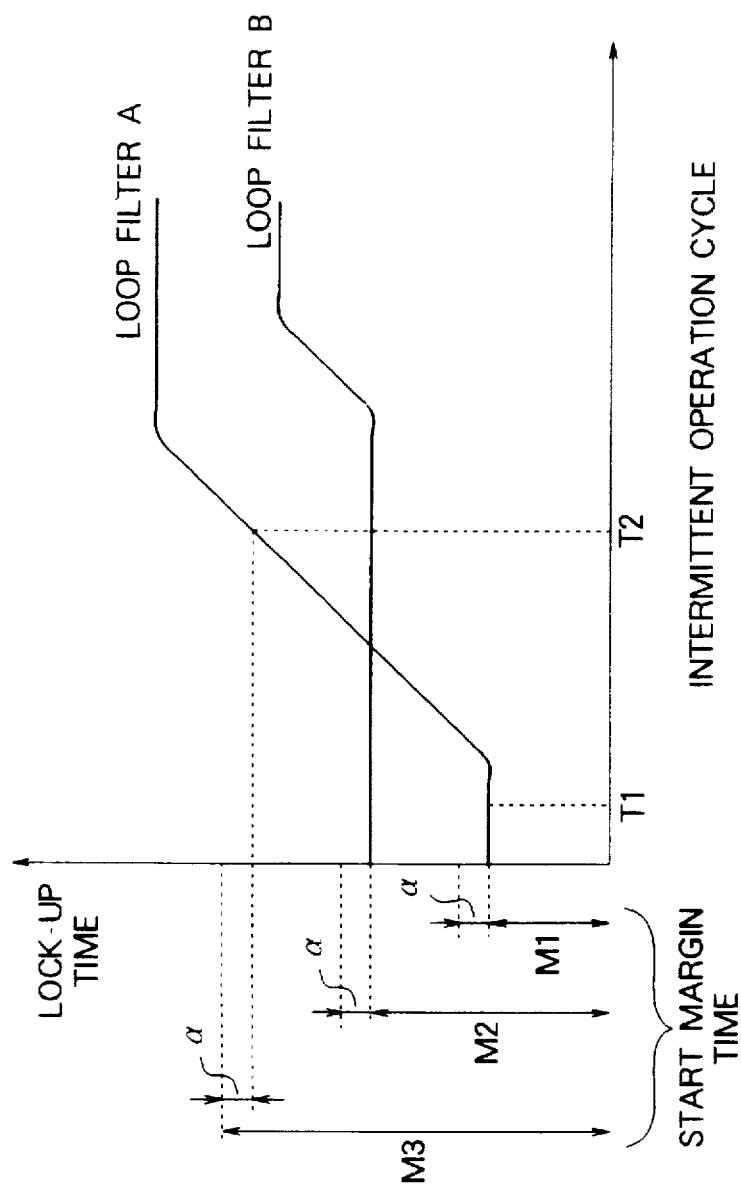
FIG. 4 is a view for use in describing operation of the conventional radio paging receiver.

Referring to FIG. 4, illustration is made about a relationship between the intermittent operation cycle and the lock-up time in the PLL synthesizer in conjunction with the time constant of the loop filter. It is general that, in order to achieve high-speed lock up (short lock-up time), the PLL synthesizer for executing the intermittent operation carries out phase matching of inputs of the phase comparator 13 (FIG. 2) of the upon start of the operation-on period. When a VT error upon start of the operation-on period is smaller than a predetermined level, phase matching is operative so that stable high-speed lock up is achieved. On the other hand, when the VT error exceeds the predetermined level, phase matching is no longer operative so that the lock-up time is substantially increased.

It is assumed here that loop filters A and B have different time constants and that the time constant of the loop filters A is smaller than the time constant of the loop filter B. In this event, the PLL synthesizer using the loop filter A has a high-speed lock-up time in case where the above-mentioned phase matching upon start of the operation-on period is operative. Accordingly, when the intermittent operation cycle is short, high-speed lock up is carried out. In the meanwhile, the voltage VT is quickly discharged. From this fact, the intermittent operation cycle is restricted within a narrow range in order that phase matching is operative to enable high-speed lock up. In other words, in case where the intermittent operation cycle is long, an advantage of high-speed lock-up is lost and the lock-up time becomes extremely long to the contrary. On the other hand, with the loop filter B having a greater time constant, the voltage VT is slowly discharged although the lock-up time is long. Accordingly, phase matching is operative over a wider range of the intermittent cycle. In other words, a substantially uniform lock-up time is obtained over a wider range of the intermittent cycle.

In the example illustrated in FIG. 4, let the start margin time be equal to a sum of the lock-up time and the margin time α as described in the foregoing. The intermittent operation cycle is varied within a range between T1 and T2. If the PLL synthesizer uses the loop filter A of a small time constant, the start margin time is equal to M1 in the short intermittent operation cycle T1. In the long cycle T2, phase matching is no longer operative and the lock-up time is increased. Therefore, the start margin time is equal to M3. On the other hand, if the PLL synthesizer uses the loop filter B of a great time constant, the lock-up time is slightly long both in the short and the long intermittent operation cycles. However, phase matching is operative in either case and the start margin time is equal to M2 and substantially uniform.

As described above, the time constant of the loop filter of the PLL synthesizer has an influence upon the start margin time. In the conventional paging receiver, the loop filter in the PLL synthesizer has a time constant which is fixedly determined and can not freely be selected. In this structure, when the loop filter A of a small time constant is used, the start margin time becomes excessively long in the long intermittent operation cycle T2, as compared with an actual lock-up time.

On the other hand, when the loop filter B of a great time constant is used, the start margin time corresponds to the actual lock-up time. However, the start margin time is excessively long in the intermittent operation cycle Ti as compared with the start margin time of M1 which is sufficient if the loop filter A is used in that cycle. Current consumption required for such excessively long start margin time results in an increase of the average current consumption of the paging receiver as a whole. This constitutes a factor of reduction of the battery life.

As mentioned above, this invention provides a radio paging receiver in which an appropriate start margin time is determined in response to variation of an intermittent operation cycle so as to reduce an average power consumption and to prolong a battery life.

A radio paging receiver according to this invention comprises a PLL synthesizer for producing a local oscillation signal and a radio section for carrying out an intermittent operation in a plurality of different cycles. The PLL synthesizer has a plurality of loop filters of different time constants selectively operable. The plurality of loop filters are selectively operated in correspondence to the different cycles of the intermittent operation.

Specifically, the radio section is for carrying out the intermittent operation selectively in a short intermittent operation cycle synchronized with a call signal and in a long intermittent operation cycle longer than the short intermittent operation cycle. The loop filters comprise a first loop filter of a small time constant and a second loop filter of a greater time constant than the small time constant so that the first and the second loop filters are selectively operable. The first loop filter is selected in the short intermittent operation cycle. The second loop filter is selected in the long intermittent operation cycle.

In a case where the intermittent operation cycle in the radio section is short, selection is made of the first loop filter of a small time constant which provides a higher speed lock-up time in a short cycle. Thus, the start margin time is shortened. On the other hand, in case where the intermittent operation cycle is relatively long, selection is made of the second loop filter having a great time constant which provides a short lock-up time in a long cycle. Thus, an increase of the start margin time is suppressed as low as possible. As a result, an average current consumption is reduced as a whole to prolong a battery life.

Figure 5:
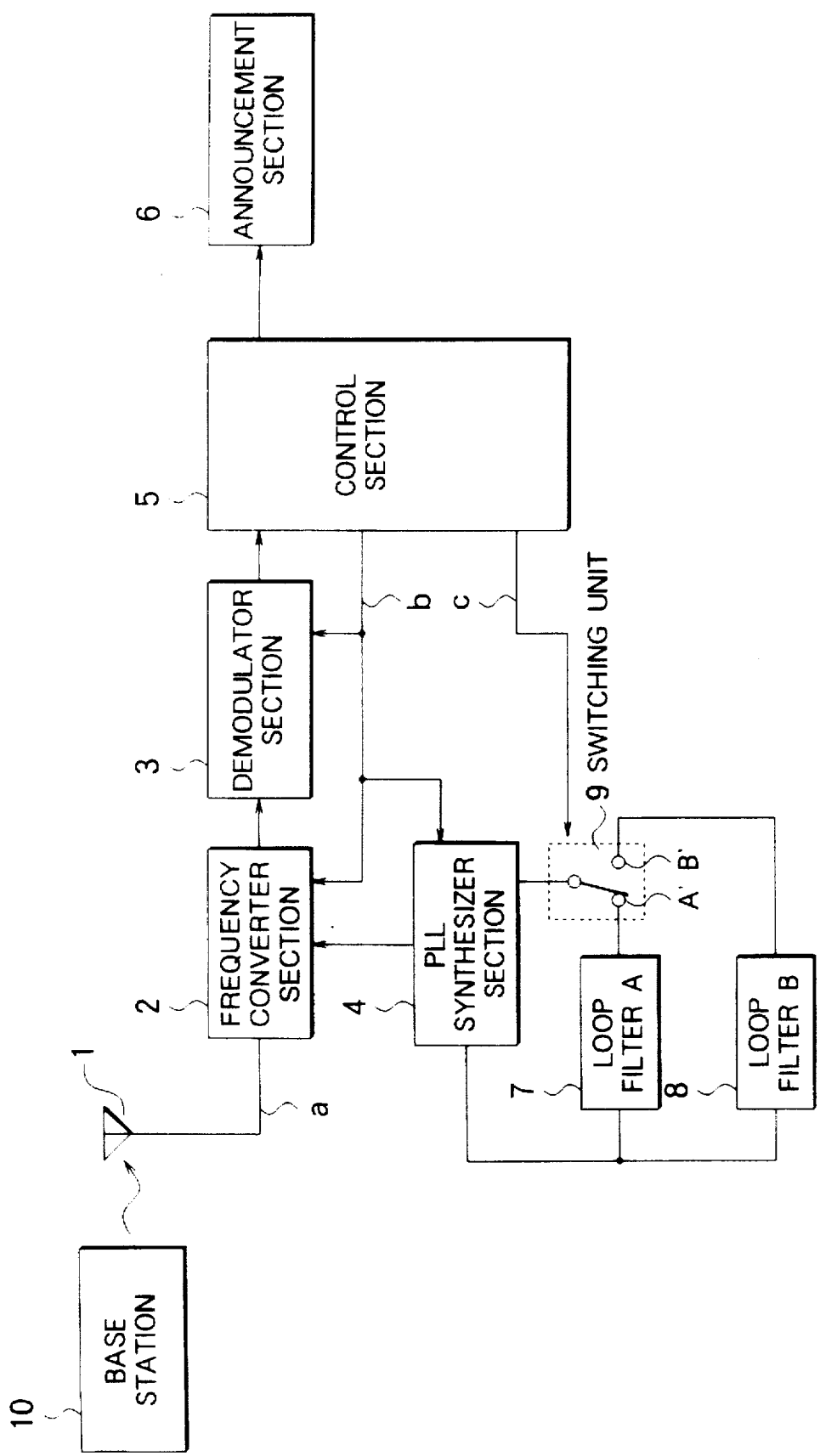
FIG. 5 is a block diagram of a radio paging receiver according to an embodiment of this invention.

Referring to FIG. 5, description will proceed to a radio paging receiver according to an embodiment of this invention. In the radio paging receiver illustrated in FIG. 5, a call signal of a high frequency is received by an antenna 1, converted by a frequency converter section 2 into an intermediate frequency, demodulated by a demodulator section 3, and supplied to a control section 5. In response to a control signal supplied from the control section 5, a PLL synthesizer section 4 produces a local oscillation signal having a frequency corresponding to a desired channel frequency and supplies the local oscillation signal to the frequency converter section 2. The frequency converter section 2, the demodulator section 3, and the PLL synthesizer section 4 will collectively be called a radio section. The control section 5 analyzes the call signal supplied from the demodulator section 3 and makes an announcement section 6 operate when the call signal specific to the receiver is received. The control section 5 produces a control signal for controlling an intermittent operation of the radio section comprising the frequency converter section 2, the demodulator section 3, and the PLL synthesizer section 4. Although detailed description will not be made, the control signal carries out control such that a synchronous mode of a cycle T1 synchronized with the call signal and an asynchronous mode of a cycle T2 longer than the cycle T1 are alternately repeated at a predetermined time interval.

The PLL synthesizer section 4 comprises a loop filter A (that is, a first loop filter) 7 and a loop filter B (that is, a second loop filter) 8. The loop filters 7 and 8 have different time constants. A switching unit 9 is for selecting one of the loop filters for use as an active loop filter in the PLL synthesizer section 4. Herein, each of the first loop filter (the loop filter A) 7 and the second loop filter (the loop filter B) 8 has a circuit structure illustrated in FIG. 2. Each filter comprises resistors R and condensers C having values appropriately determined so that the time constant of the loop filter A 7 is smaller than the time constant of the loop filter B 8. The switching unit 9 is supplied with a selection signal c from the control section 5. In response to the selection signal c, one of the loop filters is selected in synchronism with an intermittent operation cycle of the synchronous mode or the asynchronous mode. Herein, the loop filter A 7 is selected in the synchronous mode. On the other hand, the loop filter B 8 is selected in the asynchronous mode.

Figure 6:
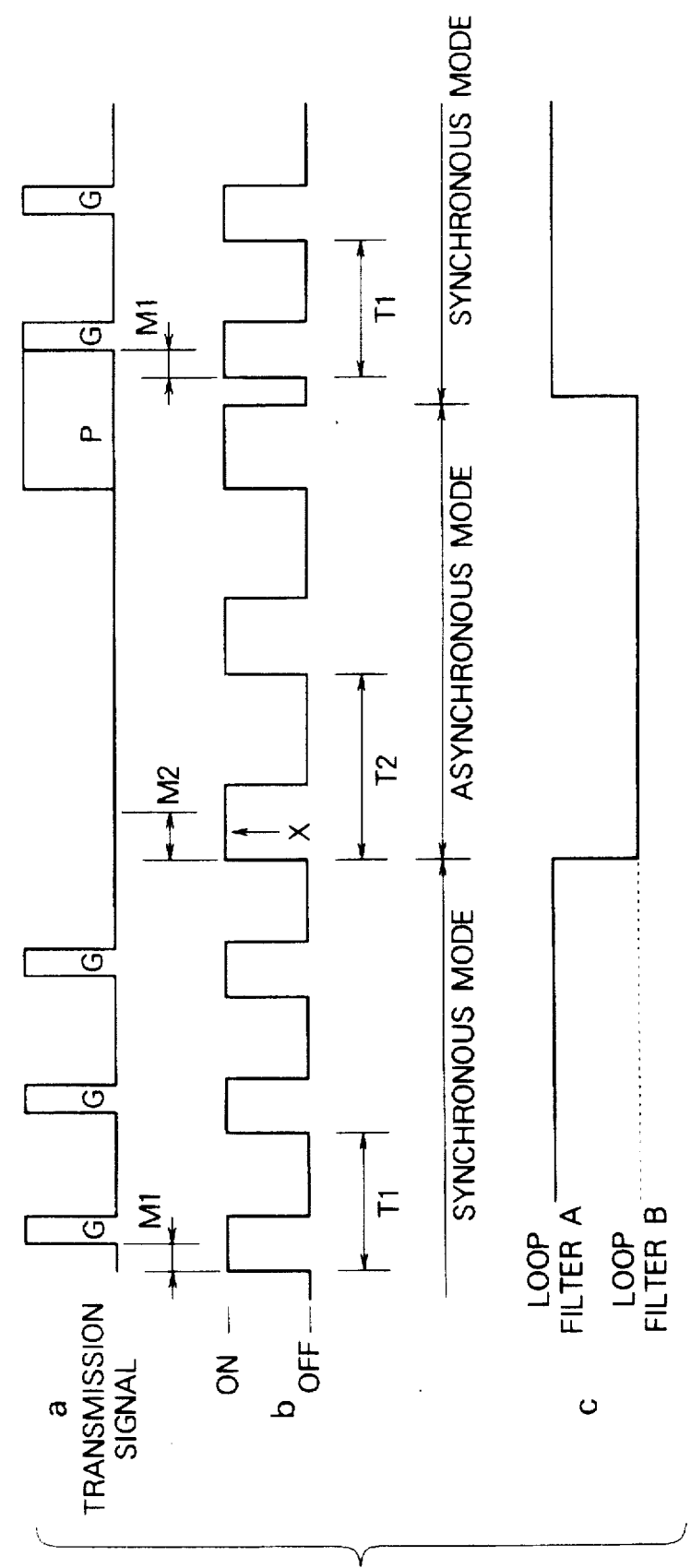
FIG. 6 is a timing chart for use in describing operation of the radio paging receiver according to the embodiment of this invention.

Referring to FIG. 6, operation of the radio paging receiver illustrated in FIG. 5 will be described. FIG. 6 is a timing chart for describing an intermittent receiving operation of the radio paging receiver described above. In the figure, a reference symbol a represents a transmission signal which is transmitted from a base station 10 (FIG. 5) and which is received by the radio paging receiver. The transmission signal comprises a call signal G including a call number for calling the radio paging receiver. The call signal G is transmitted in a predetermined constant cycle. After the call signal G is transmitted a predetermined number of times in the predetermined constant cycle, the base station 10 once interrupts transmission of the call signal G. Thereafter, the call signal G is again transmitted a predetermined number of times in the predetermined constant cycle. Transmission of the call signal G in the predetermined constant cycle after a synchronization signal P of a predetermined length is transmitted. Each of the call signal G and the synchronization signal P consists of BCH (Bose-Chaudhuri-Hocquenghem) codes.

Figure 7:
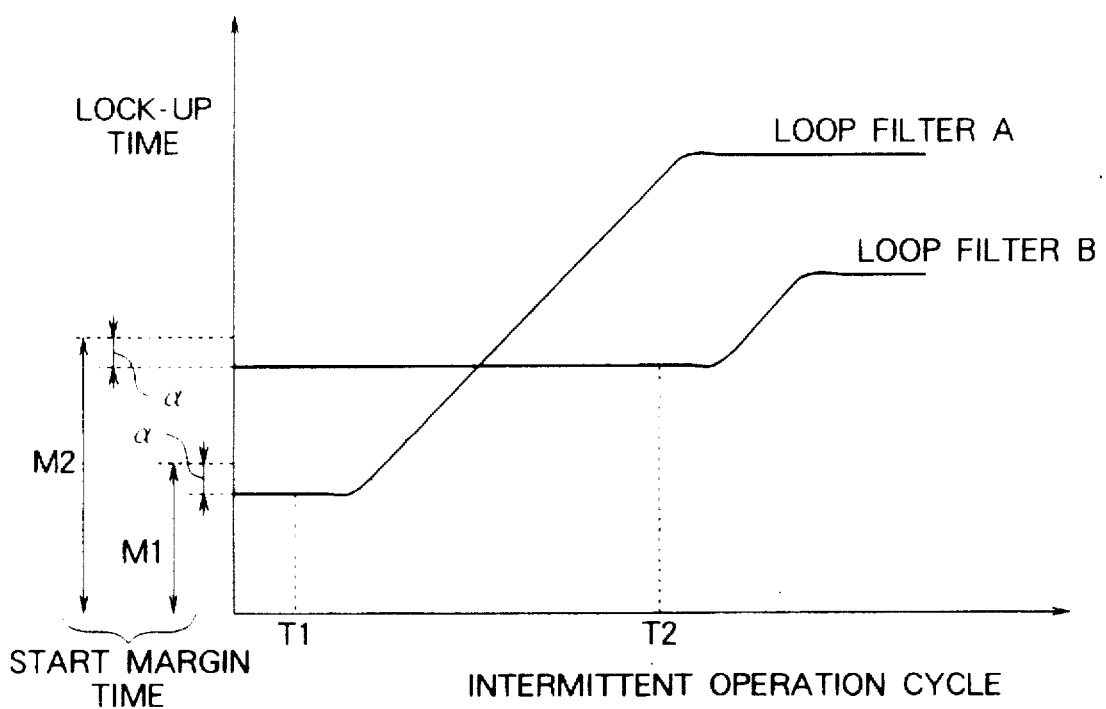
FIG. 7 is a view for use in describing operation of the radio paging receiver according to the embodiment of this invention.

In FIG. 6, a reference symbol b represents the intermittent receiving operation in the radio section of the radio paging receiver. In the synchronous mode, the radio section is intermittently operated at an interval equal to a transmission interval of the call signal. In the synchronous mode, the control section 5 (FIG. 5) transmits a predetermined selection signal c to the switching unit 9 (FIG. 5). The switching unit 9 selects the loop filter A 7 (FIG. 5) of a small time constant to compose the PLL synthesizer section 4 (FIG. 5). As a result, in the intermittent operation cycle T1 of the synchronous mode, a start margin time of the radio section is short, namely, equal to M1 corresponding to high-speed lock up, as illustrated in FIG. 7.

In FIGS. 5 and 6, when the BCH codes of the call signal G is not detected at a time instant X (FIG. 6) during the intermittent operation cycle of the synchronous mode, the control section 5 brings the receiver into the asynchronous mode. In the asynchronous mode, the control section 5 makes the radio section operate in the intermittent operation cycle T2 and delivers the selection signal c to the switching unit 9. The loop filter B 8 of a great time constant is selected to compose the PLL synthesizer section 4. As a result, the start margin time in the radio section is longer and equal to M2, as illustrated in FIG. 7.

When the synchronization signal P preceding the next call signal G is received in the asynchronous mode, the control section 5 is immediately put into the synchronous mode and makes the radio section operate in the intermittent operation cycle T1. Simultaneously, the switching unit 9 is operated by the selection signal c and again selects the A loop filter 7 to make the start margin time be equal to M1 corresponding to high-speed lock up.

As described above, in this receiver, the loop filter A 7, which provides a higher speed lock-up time in a short cycle, is selected when the radio section is operated in the short intermittent operation cycle T1. Thus, the start margin time as short as M1 is sufficient so that current consumption in the start margin time is saved. On the other hand, in the intermittent operation cycle T2 which is relatively long, selection is made of the loop filter B 8 in which a short lock-up time is sufficient in a long cycle. Thus, the start margin time is suppressed from increasing and is equal to M2. The start margin time M2 is shorter than the start margin time M3 illustrated in FIG. 4 in conjunction with the case where the loop filter A 7 is used without being switched. Thus, it is possible to save the current consumption in the start margin time by an amount corresponding to a difference therebetween.

Figure 8:
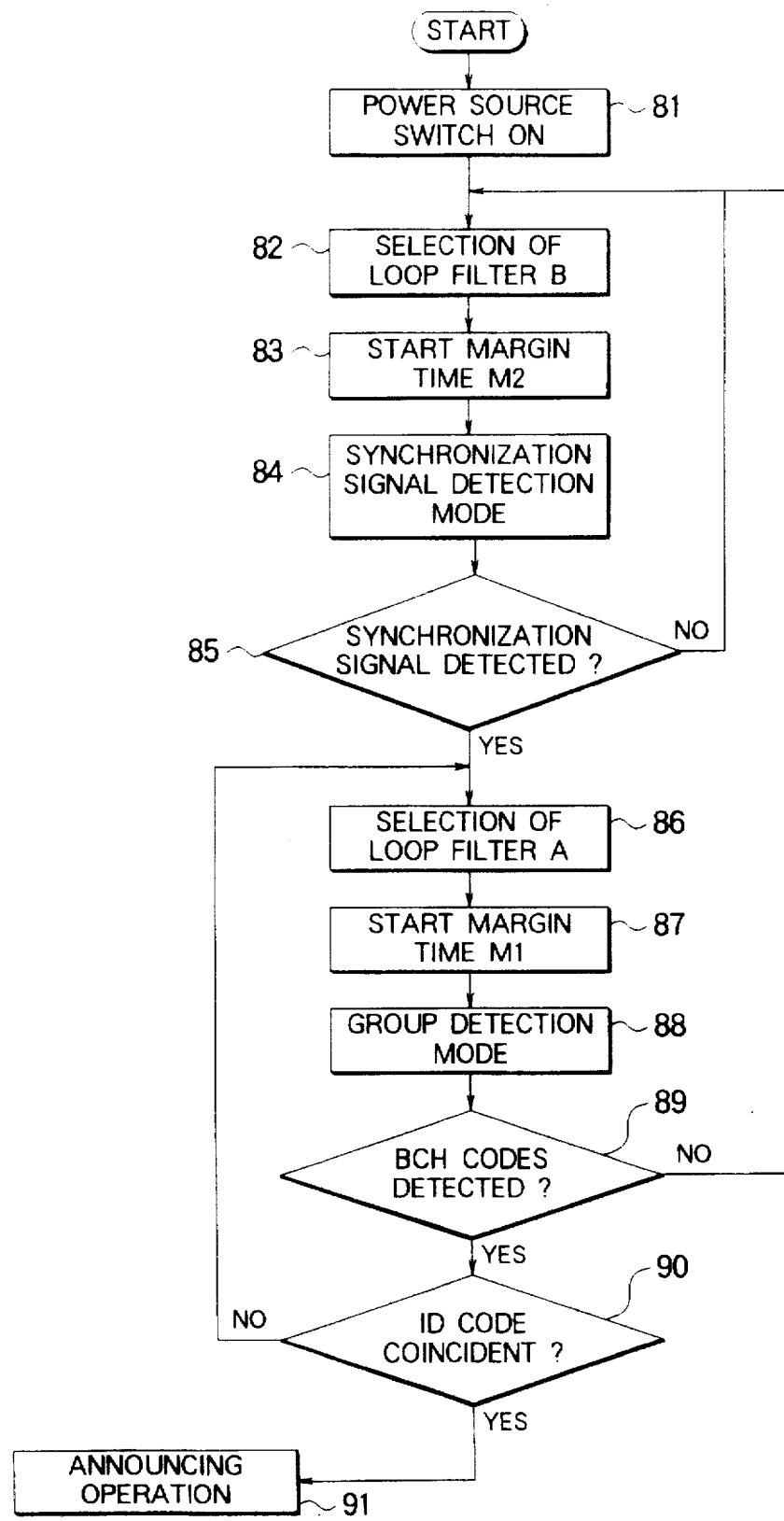
FIG. 8 is a flow chart for use in describing operation of the radio paging receiver according to the embodiment of this invention.

Turning to FIG. 8 with reference to FIG. 6, operation of the radio paging receiver of FIG. 5 will be summarized. When a power source switch is turned on at a step 81, the control section 5 supplies the switching unit 9 with the selection signal c for selecting the loop filter B 8 to make the switching unit 9 connect the PLL synthesizer section 4 to the loop filter B 8 at a step 82. That is, the switching unit 9 is switched to a terminal B' which is connected to the loop filter B 8. As a result, the loop filter B 8 is selected (see a bottom row c in FIG. 6). At a step 83 which follows the step 82, the start margin time M2 is selected. At a step 84 following the step 83, the control section 5 puts the radio section in an activated state by a power source (not shown) during a time interval equal to a sum of the start margin time M2 and a time interval of the call signal G (see a second row b in FIG. 6). This activated state is called a synchronization signal detection mode in which the radio section intermittently operates in the long intermittent operation cycle T2. The synchronization signal detection mode is substantially equivalent to the asynchronous mode. At the synchronization signal detection mode, the radio section supplies a received signal to the control section 5. At a step 85 following the step 84, the control section 5 judges whether or not the control section 5 detects the synchronization signal from the received signal. When the control section 5 does not detect the synchronization signal, operation returns the step 82. When the control section 5 detects the synchronization signal, the step 85 is followed by a step 86.

At the step 86, the control section 5 supplies the switching unit 9 with the selection signal c for selecting the loop filter A 7 to make the switching unit 9 connect the PLL synthesizer section 4 to the loop filter A 7. That is, the switching unit 9 is switched to a terminal A' which is connected to the loop filter A 7. As a result, the loop filter A 7 is selected (see the bottom row c in FIG. 6). At a step 87 which follows the step 86, the start margin time M1 is selected. At a step 88 following the step 87, the control section 5 puts the radio section in the activated state during a time interval equal to a sum of the start margin time M1 and the time interval of the call signal G (see the second row b in FIG. 6). This activated state is called a group detection mode in which the radio section intermittently operates in the short intermittent operation cycle T1 to detect a group to which the radio paging receiver belongs. The group detection mode is substantially equivalent to the synchronous mode. At the group detection mode, the radio section supplies the received signal to the control section 5. At a step 89 following the step 88, the control section 5 judges whether or not the control section 5 detects the BCH codes of the call signal G from the received signal. When the control section 5 does not detect the BCH codes of the call signal G, operation returns the step 82. When the control section 5 detects the BCH codes of the call signal G, the step 89 is followed by a step 90. At the step 90, the control section 5 judges whether or not an identification (ID) code of the radio paging receiver is coincident with the BCH codes of the call signal G. When the ID code of the radio paging receiver is not coincident with the BCH codes of the call signal G, operation returns to the step 86. When the ID code of the radio paging receiver is coincident with the BCH codes of the call signal G, the step 90 is followed by a step 91 at which the control section 5 makes the announcement section 6 carry out an announcing operation.

As described above, according to this invention, the radio section carries out the intermittent operation selectively in the short intermittent operation cycle synchronized with the call signal and in the long intermittent operation cycle longer than the short intermittent operation cycle. The loop filters comprise the first loop filter of a small time constant and the second loop filter of a greater time constant than the small time constant so that the first and the second loop filters are selectively operable. In case where the radio section is operated in the short intermittent operation cycle, selection is made of the first loop filter of a small time constant which provides a higher-speed lock-up time in a short cycle. Thus, the start margin time is shortened. On the other hand, in case where the intermittent operation cycle is relatively long, selection is made of the second loop filter of a great time constant in which a short lock-up time is sufficient in a long cycle. Thus, an increase of the start margin time is suppressed as low as possible. As a result, an average current consumption of the radio section as a whole is reduced to prolong a battery life.

What is claimed is:

1. A radio paging receiver which is for receiving call signals and which comprises PLL synthesizer means for producing a local oscillation signal, frequency converter means for frequency converting said call signals in response to said local oscillation signal to produce a frequency-converted signal, and control means for controlling said PLL synthesizer means and said frequency converter means to make each of said PLL synthesizer means and said frequency converter means carry out intermittent operation in a plurality of different cycles, wherein said PLL synthesizer has a plurality of loop filters in one-to-one correspondence to said plurality of different cycles of the intermittent operation, said plurality of loop filters having time constants different to each other, one of said plurality of loop filters being selectively operable at a time, said control means further controlling said plurality of loop filters so that a corresponding one of said plurality of loop filters is selectively operable when said control means makes each of said PLL synthesizer means and said frequency converter means carry out the intermittent operation in a particular one of said plurality of different cycles, said corresponding one of said plurality of loop filters corresponding to said particular one of said plurality of different cycles.

2. A radio paging receiver as claimed in claim 1, said paging receiver further comprising demodulator means for demodulating said frequency-converted signal into a demodulated signal and for delivering said demodulated signal to said control means to make said control means analyze said demodulated signal as an analyzed signal, said control means controlling said PLL synthesizer means, said frequency converter means, and said demodulator means to make each of said PLL synthesizer means, said frequency converter means, and said demodulator means carry out the intermittent operation in said plurality of different cycles, wherein said control means further controls said plurality of loop filters so that said corresponding one of said plurality of loop filters is selectively operable when said control means makes each of said PLL synthesizer means, said frequency converter means, and said demodulator means carry out the intermittent operation in said particular one of said plurality of different cycles.

3. A radio paging receiver as claimed in claim 1 further comprising a single-pole double-throw switch to selectively connect one of said plurality of said loop filters to said PLL synthesizer means.

4. A radio paging receiver which is for receiving call signals and which comprises PLL synthesizer means for producing a local oscillation signal, frequency converter means for frequency converting said call signals in response to said local oscillation signal to produce a frequency-converted signal, and control means for controlling said PLL synthesizer means and said frequency converter means to make each of said PLL synthesizer means and said frequency converter means carry out intermittent operation selectively in a short intermittent operation cycle synchronized with said call signals and in a long intermittent operation cycle longer than said short intermittent operation cycle, wherein said PLL synthesizer has first and second loop filters having first and second time constants, respectively, said second time constant being larger than said first time constant, one of said first and second loop filters being selectively operable at a time, said control means further controlling said first and second loop filters so that said first loop filter is selectively operable when said control means makes each of said PLL synthesizer means and said frequency converter means carry out the intermittent operation in said short intermittent operation cycle and that said second loop filter is selectively operable when said control means makes each of said PLL synthesizer means and said frequency converter means carry out the intermittent operation in said long intermittent operation cycle.

5. A radio paging receiver as claimed in claim 4, said paging receiver further comprising demodulator means for demodulating said frequency-converted signal into a demodulated signal and for delivering said demodulated signal to said control means to make said control means analyze said demodulated signal as an analyzed signal, said control means controlling said PLL synthesizer means, said frequency converter means, and said demodulator means to make each of said PLL synthesizer means, said frequency converter means, and said demodulator means carry out the intermittent operation selectively in said short intermittent operation cycle and said long intermittent operation cycle, wherein said control means further controlling said first and said second loop filters so that said first loop filter is selectively operable when said control means makes each of said PLL synthesizer means, said frequency converter means, and said demodulator means carry out the intermittent operation in said short intermittent operation cycle and that said second loop filter is selectively operable when said control means makes each of said PLL synthesizer means, said frequency converter means, and said demodulator means carry out the intermittent operation in said long intermittent operation cycle.

6. A radio paging receiver as claimed in claim 4 further comprising a single-pole double-throw switch to selectively connect one of said first and second loop filters to said PLL synthesizer means.

\* \* \* \* \*